(12) United States Patent
Schmidt et al.

(10) Patent No.: US 10,598,247 B2
(45) Date of Patent: Mar. 24, 2020

(54) VALVE FOR HYDRAULIC DAMPER

(71) Applicant: LISEGA SE, Zeven (DE)

(72) Inventors: Gunnar Schmidt, Elsdorf/Frankenbostel (DE); Joerg Bernert, Zeven-Hofkoh (DE); Heinz-Wilhelm Lange, Zeven (DE)

(73) Assignee: LISEGA SE, Zeven (DE)

( * ) Notice: Subject to any disclaimer, the term of this patent is extended or adjusted under 35 U.S.C. 154(b) by 100 days.

(21) Appl. No.: 15/316,001

(22) PCT Filed: Jun. 2, 2015

(86) PCT No.: PCT/EP2015/062256
§ 371 (c)(1),
(2) Date: Apr. 6, 2017

(87) PCT Pub. No.: WO2015/185550
PCT Pub. Date: Dec. 10, 2015

(65) Prior Publication Data
US 2017/0204933 A1      Jul. 20, 2017

(30) Foreign Application Priority Data
Jun. 2, 2014   (DE) .................. 10 2014 107 708

(51) Int. Cl.
*F16F 9/512*      (2006.01)
*F16F 9/06*       (2006.01)
(Continued)

(52) U.S. Cl.
CPC .............. *F16F 9/5126* (2013.01); *F16F 9/06* (2013.01); *F16F 9/064* (2013.01); *F16F 9/325* (2013.01); *F16F 9/34* (2013.01); *F16F 9/369* (2013.01)

(58) Field of Classification Search
CPC .... F16F 9/06; F16F 9/064; F16F 9/325; F16F 9/34; F16F 9/369; F16F 9/5126
See application file for complete search history.

(56) References Cited

U.S. PATENT DOCUMENTS 2,756,724 A * 7/1956 Stewart ................... F15B 13/01
                                                          137/494
3,416,561 A * 12/1968 Kokaly ................... F15B 11/02
                                                          137/491
(Continued)

FOREIGN PATENT DOCUMENTS

CN      102364152      2/2012
DE      1985453        5/1968
(Continued)

OTHER PUBLICATIONS

English language PCT International Search Report dated Nov. 5, 2015, in corresponding PCT Application No. PCT/EP15/062256.
(Continued)

*Primary Examiner* — Melody M Burch
(74) *Attorney, Agent, or Firm* — Grossman, Tucker, Perreault & Pfleger, PLLC

(57) ABSTRACT

The invention relates to a valve to ensure pressure compensation between subchambers of a hydraulic damper, wherein the valve comprises a first side for connection to a first subchamber and a second side for connection to a second subchamber, the valve is designed to shut off in its rest position a flow of fluid between the two sides and comprises, when deflected from its rest position, a passage channel with a passage cross-section for admitting the flow of fluid, the valve comprises two valve elements guided towards each other and movable towards each other along a path of movement in a movement direction x, one of the two valve elements is designed as a moving element and the other valve element as a seat element, a pressure can be applied to
(Continued)

the moving element, on the load side thereof, by a fluid coming from the first side, generating an effective force for moving the moving element in the moving direction x, and the moving element is connected to a spring system which applies to the moving element a spring force, generating a restoring force opposite to the effective moving force. At least one of the valve elements comprises a cylinder section comprising a plurality of passages, the passage channel runs through at least some of the passages and the passage cross-section is limited by a cross-section of these passages, while the other valve element comprises a closed cylindrical surface which lies on the one valve element in the rest position, shutting off the flow of fluid, and the passage cross-section can be adjusted by the deflection of the valve as a result of the movement of the moving element towards the seat element in the direction of movement x, the passage cross-section increasing with the deflection.

13 Claims, 4 Drawing Sheets

(51) Int. Cl.
  *F16F 9/32* (2006.01)
  *F16F 9/34* (2006.01)
  *F16F 9/36* (2006.01)

(56) References Cited

U.S. PATENT DOCUMENTS

| | | | |
|---|---|---|---|
| 3,878,864 A * | 4/1975 | Schurger | F15B 11/165 137/115.23 |
| 3,910,311 A * | 10/1975 | Wilke | F15B 13/0403 137/102 |
| 4,109,683 A | 8/1978 | Strache | |
| 4,928,799 A | 5/1990 | Zschiesche | |
| 5,018,607 A | 5/1991 | Hardtke et al. | |
| 7,766,041 B2 * | 8/2010 | Tackes | F16K 3/262 137/625.3 |
| 8,322,372 B2 | 12/2012 | Tackes et al. | |
| 2006/0237274 A1 * | 10/2006 | Hsia | B62K 25/286 188/316 |

FOREIGN PATENT DOCUMENTS

| | | |
|---|---|---|
| DE | 2001465 | 7/1971 |
| DE | 2555752 | 4/1977 |
| DE | 3816821 | 11/1989 |
| DE | 3817058 | 11/1989 |
| EP | 1686284 | 8/2006 |
| FR | 2960275 | 11/2011 |
| JP | 4-500551 | 1/1992 |
| JP | 2000-046088 | 2/2000 |
| JP | 2002-061699 | 2/2002 |
| JP | 2005-180689 | 7/2005 |
| JP | 2007-1685 | 1/2007 |
| JP | 2008-248955 | 10/2008 |
| JP | 2010-209959 | 9/2010 |
| RU | 2481507 | 5/2013 |
| RU | 131106 | 8/2013 |
| WO | 99/02888 | 1/1999 |

OTHER PUBLICATIONS

English language Written Opinion dated Nov. 5, 2015, in corresponding PCT Application No. PCT/EP15/062256.
Search Report from corresponding German Application No. 102014107708.3 dated Apr. 17, 2015.
Office Action from related Chinese Appln. No. 201580038625.X, dated Apr. 2, 2018. English translation attached.
Office Action from related Japanese Appln. No. 2016-571146, dated Dec. 26, 2017. English translation attached.
Office Action from related Russian Appln. No. 2016151274/11, dated Apr. 19, 2018. English translation attached.

* cited by examiner

VALVE FOR HYDRAULIC DAMPER

FIELD

The invention relates to a valve for ensuring equalisation of pressures between two sub-chambers of a hydraulic damper. The invention furthermore relates to a hydraulic damper.

BACKGROUND

Generic hydraulic dampers serve to dampen impacting forces such as impacts on structural elements. Generic hydraulic dampers are, for instance, used to dampen vibrations in structures such as bridges or high rise buildings that may occur during earthquakes. Hydraulic dampers are, for instance, used for this purpose in cable dampers. Generic hydraulic dampers are designed to mitigate the danger that sudden impact may separate supporting structural elements. Generic hydraulic dampers are correspondingly designed to dampen such impacts. Due to the considerable forces occurring in the area of application of such hydraulic dampers, these dampers must be constructed particularly robust to be able to dampen extremely high forces. Over and above this, such hydraulic dampers are also required to be particularly robust and reliable and this must be taken into consideration in the design of such hydraulic dampers.

Generic hydraulic dampers generally have a working chamber with a sliding piston dividing the working chamber into two sub-chambers, viz. a first and a second sub-chamber. The piston will have a fluid line with a small cross-section connecting the two sub-chambers to allow the flow of fluid between said sub-chambers. The hydraulic damper is to be fitted between the elements of two structures to be dampened against each other with the piston fastened to the first structural element and the enclosure with the working chamber fastened to the second structural element. The working chamber is filled with a hydraulic fluid. A force acting to cause relative movement between the two structural elements will slide the piston in the working chamber to thereby change the ratio of fluid volumes in the two sub-chambers. The small cross-section of the fluid line in the piston ensures dampening of the relative movement of the structural elements.

It has been found to be particularly advantageous to provide a valve in the fluid path to ensure that fluid only flows between the sub-chambers when a force between the structural elements or the relative speed of the structural elements exceeds a lower limit. This will prevent relative movement of the structural elements unless the force is correspondingly high, with the hydraulic damper allowing damped relative movement of the structural elements only in the event of a particularly high force. Conventional valves achieve this using two valve elements, one of which will be designed as a seat element and the other as a moving element. The seat element is rigidly attached to the piston and comprises at least one section of the fluid path. The moving element rests against the end of the seat element in a way as to close the fluid path when in rest position.

When in rest position, a spring system would normally exert a spring force pressing the moving element against the seat element or the fluid path. The moving element is displaced from its rest position when the pressure difference between the sub-chambers exceeds a lower limit, i.e. when the hydraulic damper is subjected to a force exceeding a lower limit. The pressure difference will in this case exert a force on the moving element that exceeds the force of the spring system, pressing said element away from the seat element to allow fluid to flow between the sub-chambers via the fluid path, i.e. from a first sub-chamber at high pressure to a second sub-chamber at a lower pressure.

Conventional hydraulic dampers, however, have the disadvantage that the valves will suddenly open when the force between the structural elements exceeds the lower limit, potentially causing jerking displacements of the structural elements. In addition, conventional hydraulic dampers are only suited for damping forces between the structural elements they are attached to if those forces remain within a certain limited range. This is because the valves in the piston will not open if the force on the hydraulic damper is too low and the piston then cannot or can hardly move in its working chamber, with no damping effect. If hydraulic dampers experience a very large force, then conventional hydraulic dampers will not allow adequate relative displacement of the construction elements, since they cannot follow large forces fast enough to prevent structural damage.

This inherent problem with conventional hydraulic dampers is due to the fact that the design of hydraulic dampers is subject to a compromise with regard to setting the minimum force beyond which damping will be ensured and setting the resilience of the hydraulic damper in case very large forces are applied.

SUMMARY

The aim of the invention is to provide a valve that will ensure pressure compensation between the sub-chambers of a hydraulic damper and that will at least partially remedy the aforementioned problems and disadvantages of conventional valves. The invention furthermore aims to provide a hydraulic damper that will at least partially remedy the disadvantages of conventional hydraulic dampers.

The present invention relates to a valve configured to ensure equalisation of pressures between sub-chambers of a hydraulic damper, wherein the valve comprises a first side for connection to a first sub-chamber and a second side for connection to a second sub-chamber, wherein the valve is designed in its rest position to block a flow of fluid between the two sides, and will open a through-flow path with a through-flow cross-section to allow a flow of fluid when displaced from its rest position, wherein valve comprises two mutually guided valve elements that are movable relative to each other in a direction of movement (x), wherein one of the two valve elements is designed as a moving element and the other valve element as a seat element, wherein the moving element is configured to be exposed on its load side to pressure of a fluid on the first side to create an effective displacement force acting on the moving element in the direction of movement (x), wherein the moving element is connected to a spring system to exert a restoring spring force opposing the effective displacement force on the moving element, characterised in that one of the valve elements includes a cylinder section with a plurality of passages, wherein the through-flow path passes through at least some of the passages and the cross section of the through-flow path is limited by a cross-section of these passages, wherein the other valve element comprises a closed cylinder shell section that at least in the rest position rests against the first valve element to block the flow of fluid, wherein the cross section of the through-flow path is adjustable via the excursion of the valve as a result of displacement of the moving element relative to the seat element in the direction of movement (x), wherein the cross section of the through-flow path will increase as the excursion increases.

The valve is designed to ensure pressure compensation between sub-chambers of hydraulic dampers. The valve is to this end designed to alternately allow and interrupt the flow of fluid between the sub-chambers of a hydraulic damper. The valve exhibits a first side to connect to a first sub-chamber and a second side to connect to a second sub-chamber of the hydraulic damper. The valve also is configured to block in its rest position the flow of fluid between the two sides, wherein the valve is configured to open a through-flow path with a through-flow cross-section for excursion from its rest position, to allow a flow of fluid. The fluid therefore passes through the through-flow path with its cross-section when the valve changes from its rest position. The valve according to the invention has two valve elements that are mechanically guided to each other to allow displacement relative to each other along a direction of movement. The two valve elements can slide relative to each other in particular, a very simple mechanical system to implement.

Curved displacement paths are also possible, however. The valve elements may be displaced relative to each other via a defined path. The two valve elements are embodied one as a moving element and the other as a seat element. The moving element may change position relative to the seat element by moving along a displacement path. The moving element and/or the seat element may be constructed as a single component.

The moving element is configured to be exposed on its load side to the pressure of a fluid on the first side, thereby effectively creating a force acting to displace the moving element in the direction of movement, wherein the moving element is connected to a spring system with the spring exerting a force on the moving element, thereby creating a restoring force in opposition to the effective displacement force. The valve is therefore constructed to allow a fluid on its first side to exert pressure in a way to allow the fluid to pass to the load side of the moving element and to allow exertion of an effective force to displace the moving element. The moving element in the valve may furthermore be designed to allow a fluid on the second side to exert pressure on its opposite side, which may be arranged facing the load side. The load side may, for instance, be facing the first side of the valve and the opposite side may be facing the second side.

The effective displacement force will naturally depend on the area over which the fluid on the first side can exert pressure on the moving element in the direction of movement. One component of the direction of movement will herein in particular have a direction connecting the first and second sides.

A difference between the pressure in the first sub-chamber on the first side of the valve and the pressure in the second sub-chamber on the second side of the valve will therefore with at least one component displace the moving element from the first sub-chamber to the second sub-chamber and thereby from the first to the second side of the valve. The effective displacement force may, for instance, be defined by the pressure exerted on the first side of the valve and the area on the load side facing the first side. Pressure may, for instance, be exerted on the valve element on the load side by fluid on the first side and on its opposite side by fluid on the second side, wherein the effective displacement force will be defined by the areas of the load and opposite sides and by the pressure difference on the two sides of the valve. The displacement force may, for instance, be defined by the pressure of fluid on the first side and the difference in the areas on the load and opposite sides if the moving element is subjected to fluid pressures on its load and opposite sides created by corresponding fluid lines to the first side.

The spring system may, for instance, be arranged on the opposite side of the moving element. The valve will in any event be constructed to ensure that the relative arrangement of the valve elements and the spring system will allow the spring to exert a restoring force on the moving element, especially with the valve in rest position, wherein the restoring force will oppose the effective displacement force that a fluid on the first side will exert on the moving element by applying pressure to the load side of the valve.

The seat element may, in particular, exhibit an end stop against which the spring system will press the moving element when in rest position.

At least one of the elements of the valve according to the invention has a cylinder section with a plurality of passages. This valve element may, for instance, be constructed as a hollow cylinder, wherein the passages are arranged in the cylinder shell. This valve element may, for instance, also be constructed as a solid cylinder, whereby the passages may be realised through axial grooves that may, for instance, run over a certain length of the cylinder section. The through-flow path in the valve according to the invention always includes at least some of the passages and the cross-section of the through-flow path will be limited by the cross-section of these passages that form part of the through-flow path. To be taken into account in this respect is that the cross-section of the through-flow path is negligibly small and the exchange of fluid between the two sides of the valve will therefore be nil to negligible. When the valve by excursion changes from rest position, a through-flow path with a certain cross-section will open, wherein the cross-section of the through-flow will be determined by the cross-section of the passages forming part of the through-flow path. The shape of the cross-section of these passages through which the through-flow path runs will limit the cross-section of the passages. The through-flow path, however, will not necessarily always utilise the full cross-section of a passage forming part of the through-flow path. The cross-section of a passage may be blocked at least partially, restricting the through-flow path to only a fraction of the full cross-section of the passage.

The cross-section of the passage will again in this case restrict the through-flow path cross-section, since the latter will be restricted by the shape of the passage cross-section. The through-flow path may obviously also include a passage with its full cross-section, wherein the cross-sectional area of that passage will then limit the cross-section of the through-flow path. The cross-section of the through-flow path may in particular also be defined by the sum of the contributions by cross-sections of passages forming part of the through-flow path.

The other element of the valve according to the invention has a closed cylinder shell section that in its rest position abuts one of the valve elements with the passages, blocking the flow of fluid. The closed cylinder shell section may, for instance, lie opposite at least some of the passages in one of the valve elements, allowing it to prevent fluid flow through the passages. The closed cylinder shell section need here not necessarily rest against the passages to thereby fully block fluid from flowing through the passages. The closed cylinder section of the other valve element may, for instance, be situated opposite the passages but spaced away somewhat to create a gap between the passages of the first valve element and the closed cylinder section of the other valve element.

The closed cylinder shell section may, for instance, nevertheless block the flow of fluid between the two sides of the valve if this gap has closed boundaries in rest position, to prevent fluid from flowing between the two sides.

This may be ensured by resting the closed cylinder shell section against the one valve element.

The closed cylinder shell section is designed to rest against the one valve element when in rest position, thereby to block the flow of fluid. The closed cylinder shell section may, for instance, have a very short axial length and/or a cross-section comprising just a section of the cylinder base area. The closed cylinder shell section may represent a section of the shell of a cylinder with its axis lying in the direction of movement. The other valve element may, for instance, have a cylindrical opening in which the cylinder section with the passages of the first valve element will be positioned at rest, at least section by section. The cylinder section of the first valve element may, for instance, be constructed as a hollow cylinder within which a cylindrical section of the other valve element with a closed cylinder shell section will be positioned, at least when in rest position. The passages in the cylinder section of the first valve element may, for instance, be positioned to rest facing the closed cylinder section block in such a way that they will be closed. The passages in the cylinder section of the first valve element may, for instance, rest with the first side adjacent to the closed cylinder shell section of the other valve element. The closed cylinder shell section of the other valve element will in any event rest against the first valve element, in particular against the cylinder section of the first valve element containing the passages. Excursion of the valve from its rest position will fully or partially open the cross-sections of at least some of the passages. This is due to the fact that excursion of the valve from its rest position in the direction of movement will change the relative position of the closed cylinder shell section and the passages.

The flow of fluid between the two sides of the valve is thereby blocked when in rest position, since the closed cylinder shell section will prevent the fluid in the passages from flowing towards the other side. Fluid will, however, flow from one side of the valve to the other via the through-flow path between the two sides for excursion of the valve, wherein the through-flow path comprises those passages that are not blocked by the closed cylinder shell section.

A certain through-flow path with a certain through-flow cross-section will in any event open with excursion of the valve according to the invention from its rest position by a certain amount. The cross-section of the through-flow path opening with the excursion of the valve according to the invention when the position of the moving element relative to the seat element changes in the direction of movement, is adjustable, wherein the cross-section of the through-flow path will increase as the displacement increases. Various embodiments of the valve according to the invention will be evident to persons skilled in the art. The moving element may, for instance, be constructed as the valve element with the passages, with the other valve element designed as the seat element. The seat element may, for instance, be constructed as the valve element with the passages, with the other valve element designed as the moving element.

A person skilled in the art will see that a valve according to the invention will have the advantage that the through-flow path running via the passages and the adjustable cross-section of the through-flow path achieved through excursion of the valve from its rest position offers decisive advantages over conventional valves, with the corresponding advantages a hydraulic damper equipped with such a valve will have.

Because of the fact that the cross-section of the through-flow path increases as the valve excursion increases, a design may, for instance, provide that a through-flow path with a very small cross-section will open for slight excursions of the valve from rest position, ensuring that a small difference in pressures on the first and second side of the valve will enable a correspondingly low flow of fluid between the two sides, ensuring that damping will be commensurate with the small pressure difference. This corresponds to a case where only a small force exists between two structural elements connected by means of a hydraulic damper fitted with the corresponding valve according to the invention. In the event that a correspondingly larger force exists, i.e. a large difference in pressure between the two sides of the valve, a large displacement may, for instance, be created in the valve, to thereby create a larger cross-section of the through-flow path and enable the valve to create a damping effect commensurate with the larger force. The valve according to the invention thereby overcomes the disadvantage of conventional valves that damping is possible only abruptly after a force exceeds a minimum amount, i.e. after the difference in pressures on the first and second side of the valve exceeds a lower limit, and that the valve will allow damping only within a small functional range of forces between two structural elements that are damped using conventional hydraulic dampers. The valve according to the invention also offers the advantage that the cross-section of the through-flow path is adjustable independently from the design of the load side of the moving element.

In the valve according to the invention, this will allow easy constructional realisation of a relationship between the pressure on the first side and the through-flow path cross-section, since the restoring force of the spring system, the area of the load side of the moving element and the cross-section of the passages are each constructionally adjustable independently from each other.

The ability to adjust the cross-section of the through-flow path via the excursion of the valve is an essential characteristic of the valve according to the invention. This is not possible in conventional valves. This adjustability may be realised in different ways according to the invention. A plurality of passages may, for instance, be arranged mutually displaced along the displacement path to thereby increase the cross-section of the through-flow path as the moving element is displaced along the displacement path and an increasing number of passages contribute to the through-flow path. The passages may, for instance, also be constructed to extend over a considerable distance of the displacement path. It may in this case, for instance, be possible for the opening of the valve by displacement of the moving element to increase the proportion of the cross-sectional area of a passage contributing to the through-flow path. Passages with different cross-sections may, for instance, be arranged along the displacement path, wherein increasing excursion of the valve will increase the cross-section of passages through which the through-flow path runs. The valve according to the invention will in any event be designed to render the cross-section of the through-flow path adjustable over a considerable distance of the displacement path and increasing as the deflection from rest position increases, to ensure that a valve according to the invention will ensure damping over a large functional range when fitted in a hydraulic damper.

The components of a valve according to the invention may, for instance, be designed for the cross-section of the through-flow path over a displacement path exceeding 0.2 mm, in particular between 0.2 mm to 2 mm and in particular 0.2 mm to 10 mm, to increase as the valve excursion increases. The valve may in particular be designed for the cross-section of the through-flow path to increase as the valve excursion increases only over a defined range, wherein the excursion range corresponds to a section of the displacement path with reference to the displacement of the moving element. The cross-section of the through-flow path may, in particular for excursions halfway through the excursion range, also amount to less than half, in particular also less than one third of the maximum cross-section of the through-flow path for excursion of the valve to the maximum of the excursion range.

The cylinder section of the valve element with the passages will be designed in the form of a cylinder. The passages may pass through the cylinder shell of the cylinder section. The cylinder section may, for instance, be designed as a cylinder with polygonal cross-section. Designing a cylinder section as a cylinder with a round cross-section may be particularly advantageous in ensuring relative and guided movement of the two valve elements. Passages passing through the cylinder shell of the cylinder section will result in an adjustable cross-section of the through-flow path along a displacement path, wherein the displacement path may in particular run parallel to the cylinder axis of the cylinder section. The cylinder section may, in one embodiment of the invention, be designed to deviate from the ideal cylindrical shape by having a frustoconical shape to potentially improve the adjustability of the cross-section of the through-flow path following excursions of the valve.

Designing the cylinder section as a straight cylinder may be particularly advantageous towards particularly good guidance between the two valve elements. It may in particular be advantageous for the cylinder section of the valve element with the passages to be a hollow cylinder. The through-flow path may then run through the inside of the hollow cylinder, through passages in the cylinder shell and through a channel connecting to the outside of the hollow cylinder.

The cylinder section of the first valve element and the closed cylinder shell section of the other valve element may be arranged relative to each other such that one of the sections is a hollow cylinder within which at least parts of the other section will fit to ensure guided relative movement of the two valve elements along a displacement path lying parallel to the also parallel cylinder axes of the two sections. One of the sections may, for instance, be a hollow cylinder and the other a solid cylinder, wherein the passages are found in one of the sections. Both sections may, for instance, be designed as hollow cylinder types. The sections may, for instance, be designed to fit into each other with enough play to allow hydraulic fluid to enter the space between sections to reduce friction. Enough play may be provided to allow small amounts of hydraulic fluid to pass from the first to the second side of the valve between the sections, when hydraulic fluid applies pressure to the valve on its first side.

The two valve elements may in particular also be designed to fit into each other without the requirement of a seal. This implies that perfect sealing between the two sides of the valve will not be assured for any relative position of the two valve elements and hydraulic fluid will always be able to pass through the valve from one side to the other. Fitment without a seal may ensure that a hydraulic damper containing a seal as described can dynamically absorb small forces and thereby avoid tension caused by, for instance, different thermal expansion, between structural elements separated by hydraulic dampers.

This type of flow of hydraulic fluid, enabled by the play between the two valve elements, may, for instance, be allowed also in rest position. The cross-section of a path allowing a hydraulic fluid to flow from one side of the valve to the other, passing between valve elements in rest position, will in any event amount to only a fraction of the maximum cross-section of the through-flow path during a corresponding excursion of the valve; such a cross-section will in particular amount to less than 1% of the maximum possible cross-section of the through-flow path.

A section of the other valve element may, for instance, be designed as a hollow cylinder constituting the closed cylinder shell section, wherein in particular a cylinder shell section with passage openings may be present, spaced axially from the closed cylinder shell section. The reference here is the axis of the cylinder that in sections includes the closed cylinder shell section.

The closed cylinder shell section may in rest position abut one valve element and may in particular also abut the valve element for each excursion of the valve. The design of the cylinder shell section as a hollow cylinder refers to a design of the closed cylinder shell section ensuring that it will form a guide for an axially moveable internal cylinder. The passages may in rest position be located in the closed cylinder shell section or axially adjacent to the closed cylinder shell section, towards one of the two sides of the valve. For a certain excursion of the valve from rest position by relative displacement of the valve elements along the path of displacement that runs axially in relation to the axis of the closed cylinder shell section, the cylinder section of the valve element with the passages will be displaced relative to the closed cylinder shell section of the other valve in such a way that a certain number of passages will at least in part come to lie axially adjacent to the closed cylinder section. The ability of adjusting the cross-section of the through-flow path may be improved by providing passage openings in a cylinder shell section axially aligned with the closed cylinder shell section. This will allow limitation of the cross-section of the through-flow path via both the cross-section of the passages and the cross-section of the passage openings. The through-flow path, at least for certain excursion of the valve, will then in particular include both the passage openings and the passages themselves. Starting from rest position, where the fluid flow between the sides is blocked, excursion of the valve may then be designed to displace the valve elements relative to each other along the displacement path in a way to ensure that at least some of the passages will face at least some of the passage openings.

The number of passages and passage openings facing each other and the overlapping cross-sections of the passage openings and passages will depend on the excursion. A certain excursion may be designed to create a certain cross-sectional area over which the passage openings and passages overlap. The ability to adjust the cross-section of the through-flow path may be improved by designing the other valve element with two closed cylinder shell sections separated by passage openings in the direction of movement, wherein particularly the one valve element has two zones separated from each other in the direction of movement, each with passages.

The combined cross-sectional area of the passages through which the through-flow path runs will preferably increase with the excursion of the valve from its rest position through displacement of the moving element along the displacement path. The same may apply to the passage openings. The combined cross-sectional area of the passages through which the through-flow path runs will be given by the sum of the cross-sectional areas of the passages as such. The cross-section of the through-flow path need not here correspond to the combined cross-sectional area, since at least some of the passages used by the through-flow path may be blocked at least partially, for instance by the closed cylinder shell section of the other valve element. The proportion of the cross-sectional area of a passage included in the through-flow path may, in particular, increase as the excursion of the valve increases, since a smaller proportion of the cross-sectional area of this passage will be blocked as the excursion increases. Since the combined cross-sectional area of the passages included in the through-flow path will increase as the valve excursion increases, the cross-section of the through-flow path will also increase as the excursion of the valve increases.

The valve as fitted in a hydraulic damper will correspondingly ensure that a large force applied to the two sides of a hydraulic damper and consequently a large pressure difference between the two sides of the valve will ensure that large volumes of hydraulic fluid will pass through the valve, in particular via a cross-section of the through-flow path that is larger than when a smaller force is applied. This means that the valve has the flexibility for application across a wide functional range.

At least some of the passages will preferably be arranged with their centres mutually offset in the direction of movement, wherein, in particular, at least some of the passages will be in the form of elliptical bores. The elliptical bores may, for instance, be substituted by round or oval bores. This will allow the number of passages included in the through-flow path to increase for excursions of the valve from rest position, for instance by ensuring that increasingly large excursions will, in the direction of movement, find an increasing number of passages in the first valve element located adjacent to the closed cylinder section of the second valve element. The passages with mutually offset centres may, for instance, also have different diameters. The mean diameter of passages included in the through-flow path for small excursions may, for instance, be smaller than the mean diameter of passage openings included in the through-flow path when excursions are larger. In the case of increasingly large excursions from rest position for instance, the through-flow path may initially include passages with ca. 2 mm diameter and, in the event of further excursions, add passages with ca. 5 mm diameter.

The number of passages in the direction of movement may, in particular, vary, where particularly the number of passages may increase in the direction of movement in a way to increase the number of passages included in the through-flow path as the excursion of the valve from rest position increases through displacement of the moving element along the displacement path. This may improve the potential for adjustment of the cross-section of the through-flow path as a function of the excursion.

Passages that are mutually offset in the direction of movement may, in particular, differ partially at least in their cross-sectional area, particularly in their diameter, wherein particularly the cross-sectional area of passages may increase in the direction of movement in such a manner that the cross-sectional area of passages included in the through-flow path will increase as the excursion of the valve from rest position increases. Mutually offset passages that differ partially at least in their cross-sectional area may ensure that the through-flow path will include passages with different cross-sectional areas, depending on the excursion of the valve, yielding a different cross-section of the through-flow path for each different excursion of the valve. This may further improve the potential for adjusting the cross-section of the through-flow path as a function of the excursion of the valve. By increasing the cross-sectional area of the passages included in the through-flow path as excursions increase, large volumes of hydraulic fluid will be allowed to pass through the valve when excursions are large and therefore when the difference between pressures on the two sides of the valve is large.

The cross-sectional area of the passages included in the through-flow path may change in a way to increase the mean cross-sectional area of all passages, i.e. the combined cross-sectional area of all passages included in the through-flow path, divided by the number of passages included in this path, as the excursion increases.

In one embodiment of the valve according to the invention, the valve has a bypass to ensure an uninterrupted connection between its two sides. The bypass may, for instance, be implemented as a bore. The bypass may, for instance, penetrate the moving element, connecting the load side of the moving element to the opposite side of the moving element, opposite the load side. This bypass will ensure compensation of pressures on the two sides of the valve even when the pressure difference is very small. The bypass will allow fluid to flow through a very small cross-sectional area only. The flow cross-section of the bypass may, for instance, allow less than 10%, in particular less than 5%, in particular less than 1% of the maximum cross-section of the through-flow path of the valve.

The effective area of the moving element via which the effective moving force may be exerted on the moving element when a fluid on the first side applies pressure to the moving element should preferably be less than the cross-section of the cylinder section in which the passages are found. For cases in which one of the valve elements has passages and the other valve element has passage openings, the effective area may be smaller than the cross-section of the specific sections in which the passages or passage openings are found.

The effective area here designates that area via which the effective displacement force may actually be exerted on the moving element when pressure is exerted on the first side of the valve. If the moving element is designed as a solid cylinder, wherein the load side of the moving element is a circular plane oriented orthogonal to the displacement path of the moving element which runs parallel to the cylinder axis of the moving element, the effective area will, for instance, be equal to the circular area of the load side of the moving element.

The effective area must in any case be calculated based on the cross-section of the of the moving element on its load side that is orthogonal to the displacement path, since only pressure in the direction of the displacement path will generate effective displacement forces on the moving element. When the moving element is designed as a solid cylinder with an axial bore extending throughout the entire cylinder, wherein a back pressure chamber with a connection to the first side allowing hydraulic fluid to enter when pressure is exerted on the moving element, is provided on the opposing side to the load side of the moving element, the effective area should be calculated as the difference between the cross-sectional area of the moving element on its load side and on its back pressure side, since the force exerted on the moving element from the back pressure side will reduce the effective moving force.

In a stepped design of the moving element, with the cross-sectional area of the moving element on the load side exceeding that on its opposite side, the effective area will be given by the difference between the cross-sectional areas on the two sides.

Because the effective area is smaller than the cross-section of the cylinder section in which the passages are found, the large cross-section of the cylinder section will firstly enable the creation of a through-flow path through passages with a large cross-section and secondly reduce the effective displacement force required. This will, for instance, allow the provisioning of a spring system exerting a relatively small restoring force on the moving element, which will be advantageous and allow the manufacture of a fully functional valve according to the invention.

The diameter of the moving element will preferably change at least by section, in particular through stepping. The diameter of the moving element may in particular reduce in the direction of movement towards the load side. This will, for instance, allow adjustment of the effective area on the load side of the moving element, via which pressure may be exerted on the moving element from the first side, independently of the diameter of the moving element at other positions along the direction of movement. It should in particular be taken into account that the arrangement of the valve with the two valve elements will determine the direction of movement, which may in particular coincide with a cylinder axis of the moving element or run parallel to a cylinder axis that the moving element may have over a section in which it is cylindrical in shape.

The moving element may in one embodiment of the invention have a fluid passage that has at least one component running parallel to the direction of movement and will create a fluid-carrying connection between the load side and an opposite side of the moving element that lies opposite the load side, wherein the opposite side has a back pressure chamber designed to accept and collect fluid reaching the opposite side via the fluid-carrying connection to ensure that a back pressure will be exerted on the opposite side of the moving element, ensuring that a force opposing the displacement force will be exerted on the moving element. The fluid passage may, for instance, be designed with a cross-section of at least 10%, in particular at least 30%, in particular at least 50% of the maximum cross-section of the through-flow path. A large cross-section of the fluid passage may ensure particularly good functionality of the back pressure chamber. The back pressure chamber may, for instance, be located in the seat element. The back pressure chamber may, for instance, be separated from the second side such that a flow of fluid from the back pressure chamber to the second side will be restricted to the through-flow path, to ensure that first side pressure increasing the pressure in the back pressure chamber cannot immediately be released into the second side. As explained above, a suitable design may ensure that the effective displacement force that a fluid on the first side can exert on the moving element in the valve may be kept relatively low even for great pressures, meaning that, for instance, a spring system with a low spring force may be utilised and yet bring adequate restoring force to bear on the moving element to retain the moving element in its rest position when the pressure on the first side is low, but allow only slow movement along the displacement path when the pressure on the first side increases.

It should generally be taken into account that the valve according to the invention is designed to block the flow of fluid when the restoring force exceeds the displacement force, whereas the valve has a through-flow path when the displacement force exceeds the restoring force by a sufficient amount, wherein the excursion of the valve and thereby the displacement of the moving element from rest position along the displacement path will increase as the displacement force increases.

In one embodiment of the invention, the spring system comprises a spring element and a support element, wherein the support element is connected to the seat element. The support element may, for instance, comprise an integral part of the seat element or a separate component connected to the seat element in a valve ready for use. The support element may comprise a passage to allow through-flow of fluid. The connection may, for instance, be screwed on or press fitted. The support element will ensure that the spring force acts between the seat element and the moving element. This will allow particularly effective restorative action when pressure applied to the moving element on its load side causes a displacement of the moving element relative to the seat element. The spring system will furthermore preferably comprise an adjustment device to pretension the spring element between the support element and the moving element, to set the restoring force the spring system will exert on the moving element in rest position. The minimum displacement force required to displace the valve from its rest position may accordingly be set via the adjustment device.

A displacement force required to open a through-flow path in the valve may correspondingly be set by means of the adjustment device. A specific displacement force required to provide a through-flow path in a valve with a specific cross-section of the through-flow path may accordingly be set. In a valve according to the invention comprising the above embodiment, an adjustable pressure difference required between the sub-chambers of the hydraulic damper for the valve to open a through-flow path with a specific cross-section may accordingly be defined.

The valve according to the invention will preferably have a damping facility comprising at least one damping chamber located between the seat element and the moving element, with the volume of said chamber depending on the position of the moving element along the displacement path, wherein the damping facility comprises a damping bypass designed to connect the damping chamber with the first and/or second sub-chamber. The volume of the damping chamber may, for instance, be negligibly small when the valve, and thus the moving element, are in rest position. Accordingly, a connection between the damping chamber, which does not exist in rest position and a sub-chamber via a damping bypass will then also not be possible. The damping bypass may be located in the seat element or the moving element in a way to ensure a connection between the damping chamber and at least one of the sub-chambers whenever the moving element is displaced from its rest position and a damping chamber exists. The bypass may, for instance, be located in the seat element, for example in the moving element The damping bypass may, for instance, be constructed as a channel bypass, such as a bore, for instance as a channel bypass in the moving element and/or in the seat element.

The damping bypass may, for instance, be created in the form of play between the two valve elements, in particular in the form of a loose fit between the valve elements. The cylinder section of the first valve element may, for instance, be constructed to loosely fit the closed cylinder shell section of the other valve element.

A connection via the bypass between the damping chamber and at least one of the sub-chambers may be ensured if the bypass opens out into at least one side of the valve such that a connection is created between the specific sub-chamber and the damping chamber in a valve connected to a first sub-chamber on its first side and a second sub-chamber on its second side, for instance a valve according to the invention as described above, utilised in a hydraulic damper. The damping bypass may, for instance, run through the seat element and open out into one of the two sides of the valve; the damping channel may, for instance, be located in the moving element and open out into the other side of the valve. Two damping bypasses may, for instance, be provided with both, for example, opening out into the same side or each into a different side of the valve.

Improved damping of a hydraulic damper with a valve according to the invention may be achieved by judicious arrangement of damping chamber and damping bypass. The damping chamber and damping bypass may retard displacement of the moving element from its rest position when pressure is exerted on the valve from its first side, since the damping bypass will allow only a slight flow of fluid into the damping chamber and since, firstly, a change of damping chamber volume is required for an excursion and, secondly, volume change will require a flow of fluid through the damping bypass.

This may, for example, where a hydraulic damper comprising a valve according to the invention is fitted between structural elements, counteract jerky relative movement of said elements. A relevant hydraulic damper may furthermore be ideally suited for damping vibrations between structural elements.

The moving element and the seat element will preferably each have a design stepped down in the direction of movement, wherein the damping chamber will be located between the two stepped valve elements defining the stepped shape. This will enable very easy and effective realisation of a damping chamber in the valve according to the invention, with the chamber volume a function of the excursion from rest position of the moving element along the displacement path.

The invention furthermore relates to a hydraulic damper for damping of vibrations in structures. As explained for conventional hydraulic dampers, a hydraulic damper the invention relates to will be suited to damp forces between two structural elements separated by the hydraulic damper. The hydraulic damper according to the invention comprises a working chamber with a hydraulic fluid, containing a movable piston that divides the working chamber into two sub-chambers, viz. a first and a second sub-chamber. The hydraulic damper comprises at least one valve to alternately allow and block a flow of fluid between the sub-chambers, to ensure compensation of pressures in the sub-chambers. The hydraulic damper will preferably comprise at least two valves, wherein a first valve will be constructed to permit or block a flow of fluid from the first sub-chamber to the second sub-chamber and a second valve will permit or block a flow of fluid from the second sub-chamber to the first sub-chamber, wherein each of the two valves will allow flow of fluid between the sub-chambers in only one direction and consistently block flow in the opposite direction. The valve may, for instance, be located in the piston. The valve may, however, also be located for instance in a side wall of the working chamber or in the piston rod. The valve may also, for instance, be located in an external valve chamber connecting the two sub-chambers, external to the working chamber. The hydraulic damper may, for instance, be constructed such that the working chamber is connected to a first structural element and the piston to a second structural element to damp forces between the two structural elements.

In the presence of a relevant force between the structural elements, the hydraulic damper will dampen the force by moving the piston in the working chamber along its path, thereby changing the ratio of fluid volumes in the sub-chambers. The piston may, for instance, have a chamber bypass connecting the sub-chambers to at all times allow a flow of fluid between the two sub-chambers, across a small cross-section. The valve may, for instance, be constructed to allow a flow of fluid only when the difference between pressures in the two sub-chambers exceeds a lower limit. The hydraulic damper may, for instance, have a valve according to the invention.

In an embodiment of the invention, the hydraulic damper according to the invention comprises a piston rod attached to the piston, wherein the piston rod extends axially through the working chamber and will in all positions extend beyond the working chamber into a compensation chamber located axially in line behind the working chamber and will be connected to the working chamber via a channel.

At least one bounding wall of the compensation chamber is constructed as a separation element separating the compensation chamber from a gas pressure chamber located against the compensation chamber, wherein the separation element will be designed to ensure variation of the ratio of compensation chamber volumes and gas pressure chamber volumes. The axial extension of the piston rod will simultaneously determine the direction in which the compensation chamber will be located adjacent to the working chamber. The channel between compensation chamber and working chamber may, for instance, function as a bypass with a small flow cross-section and the channel may, for example, also include a valve. Since the gas pressure chamber is separated from the compensation chamber by a separation element designed to ensure variation of the ratio of compensation chamber and gas pressure chamber volumes, the volume of the gas pressure chamber may be reduced if the volume of hydraulic fluid or of the piston rod in the compensation chamber is increased. The separation element may to this end, for instance, be designed to be movable. The compensation chamber may, for instance, be designed as a hollow cylinder or have a prolongation towards the gas pressure chamber in the form of a hollow cylinder, wherein the separation element may be located movable in the relevant hollow cylinder to allow corresponding variation of volume ratios. The separation element may, for instance, be elastic, for instance in the form of an elastic membrane fitted between the compensation and gas pressure chambers, to ensure or support volume ratio change.

It may be ensured by arranging the compensation chamber and working chamber axially in sequence, that every movement of the piston rod and thus every movement of its solidly attached piston will directly change the piston rod volume located in the compensation chamber. The piston rod may here be arranged in the compensation chamber in such a way that it will be immersed the hydraulic fluid. The piston rod in the compensation chamber may in any case be arranged such that the change of piston rod volume in the compensation chamber will, given theoretically assumed constant hydraulic fluid volume in the compensation chamber, will directly increase the compensation chamber pressure. This will allow movement of the piston rod as such to bring about displacements of the separation element, independent of whether displacement of the piston rod and simultaneous displacement of the piston will simultaneously also change the volume of fluid in the compensation chamber.

The described embodiment of the hydraulic damper according to the invention will have significant advantages. Pressure change in the working chamber caused by the expansion of hydraulic fluid in the working chamber at increased temperatures may be effectively counteracted by means of a compensation chamber. The increase of pressure in the working chamber with rising temperature may be buffered by the compressible gas in a gas pressure chamber separated from the compensation chamber by a separation element.

By positioning the gas pressure chamber adjacent to the compensation chamber and outside the working chamber, easy access to the gas pressure chamber from the outside may furthermore be ensured, thereby allowing monitoring of the pressure in the gas pressure chamber and adjustment of the pressure or the exchange of gas, as needed. The design of the embodiment according to the invention will furthermore ensure that a restoring force will act on the hydraulic damper when it changes from its stationary position, tending to return the damper to its stationary position. Contributing to this in particular is the circumstance that a displacement of the piston rod will directly change the piston rod volume in the compensation chamber and thus directly change the pressure in the gas pressure chamber. The gas in the gas pressure chamber will therefore exert a corresponding restoring force on the hydraulic damper. The restoring force is thus generated not only by changes in the volume of hydraulic fluid in the compensation chamber but also by a change in the piston rod volume in the compensation chamber.

The gas pressure chamber will preferentially be located axially in line behind the compensation chamber, wherein the piston rod in particular will extend at least into a range of positions in the gas pressure chamber. The piston rod may, for instance, extend into the gas pressure chamber from any arbitrary position of the piston along its path inside the working chamber. The hydraulic damper may, however, also be designed such that the piston rod will, from some positions of the piston along the piston path, extend only into the working chamber and compensation chamber, but will extend into the gas pressure chamber as well from other positions of the piston along the piston path.

The embodiment according to the invention can ensure that a change in the position of the piston rod will directly change the piston rod volume in the gas pressure chamber, at least over a range of positions of the piston rod or piston, with the result that a displacement of the piston rod as such can affect the restoring force acting on the hydraulic damper.

In an embodiment of the invention, the piston rod will be arranged in the hydraulic damper such that any change in the position of the piston rod will change the volume of the piston rod located inside the gas pressure chamber or the compensation chamber, wherein any change to this piston rod volume will directly contribute to a change in the ratio of pressures in the compensation chamber and the gas pressure chamber. The piston rod may, for instance, be arranged in the hydraulic damper such that it will always extend fully through the compensation chamber and into the gas pressure chamber from a range of positions of the piston along the piston path, with the result that a change in position of the piston rod within this range will not directly change the piston rod volume in the compensation chamber, but will change the piston rod volume in the gas pressure chamber. The piston rod may, for instance, be arranged in the hydraulic damper in such a way that the piston rod will, over a range of positions, extend into the working chamber such that any change in position of the piston rod within this range of positions will directly change the piston rod volume in the working chamber, whilst the piston rod volume in the gas pressure chamber will not change as the position of the piston rod changes within this range.

The embodiment according to the invention will reliably ensure that position changes of the piston rod will contribute to the generation of a restoring force in the hydraulic damper.

BRIEF DESCRIPTION OF THE DRAWINGS

The invention is explained in detail below, based on exemplary embodiments of the invention illustrated by means of six Figures. The figures show.

DETAILED DESCRIPTION

Figure 1A:
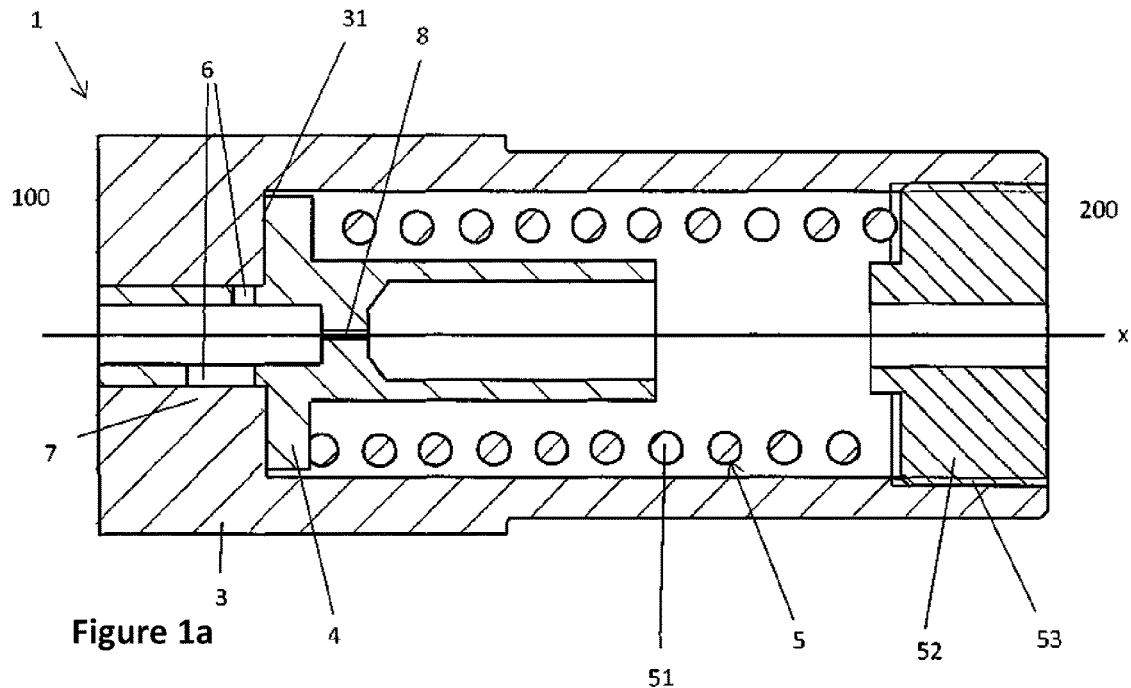
FIG. 1a is a schematic sectional view of a first embodiment of the valve according to the invention.

FIG. 1a illustrates an embodiment of valve 1 according to the invention by way of a schematic cross-section. FIG. 1a shows valve 1 in its rest position. Valve 1 comprises a seat element 3 and a moving element 4. Seat element 3 has a cylindrical section in the form of a hollow cylinder with a closed cylindrical shell section 7. This cylindrical section of seat element 3 holds a section of moving element 4, which is also constructed as a hollow cylinder featuring passages 6 in its cylinder shell. The hollow cylinder section of moving element 4 fits loosely into the aforementioned hollow cylinder section of seat element 3. Moving element 4 and seat element 3 are mutually guided over the two sections, whereby the play between moving element 4 and seat element 3 is sufficient to allow small quantities of hydraulic fluid to penetrate between moving element 4 and seat element 3, thereby lubricating between the elements.

FIG. 1a shows that the diameter of moving element 4, which in some embodiments and also in the embodiment shown in FIG. 1a, may be taken as equivalent to the cross-section of moving element 4 orthogonal to the direction of movement, changes in steps. From the step on its load side to its opposite side, the cross-section of moving element 4 actually increases in steps. Since seat element 3 has a matching stepped design, it has an end stop 31 against which moving element 4 will rest when in rest position. The matching stepped design of seat element 3 and moving element 4, creating an end stop 31 against which moving element 4 will come to rest against seat element 3, may have general advantages to valves according to the invention.

In rest position, spring system 5 will press moving element 4 against the end stop of seat elements 3. Spring system 5 comprises spring element 51 and support element 52 and an adjustment device 53. Adjustment device 53 is designed as a thread between support element 52 and seat element 3. This will allow the spring force which spring system 5 will exert on moving element 4 to be set via adjustment device 53. Spring element 51 will always be connected to seat element 3 via support element 52. The restoring force exerted by spring system 5 on moving element 4 in rest position and when deflected from rest position is adjustable via the spring tension.

In rest position as illustrated, passages 6 of moving element 4 will be opposite closed cylinder shell section 7 of seat element 3, with the effect that valve 1 has no through-flow path in this position. The closed cylinder shell section 7 will effectively prevent through-flow from first side 100 to second side 200 through passages 6. Valve 1, however, has a bypass 8 that permanently interconnects sides 100 and 200 of valve 1, allowing a slight difference in pressure that may arise on sides 100 and 200 to be compensated via bypass 8.

When pressure in excess of the pressure in rest position is exerted on valve 1 from its first side 100, moving element 4 will, on its load side facing first side 100, experience a displacement force towards the second side 200.

As soon as the displacement force exceeds the restoring force, valve 1 and thus moving element 4 will be deflected from its rest position, wherein moving element 4 will move in the direction of movement x which, in the illustrated embodiment of the invention, coincides with the axis of the cylinder section designed as a hollow cylinder with passages 6 of the moving element 4 and with the axis of the cylinder section designed as a hollow cylinder with closed cylinder shell section 7 of seat element 3. As soon as moving element 4 is displaced from its rest position to the extent that at least one of the passages 6 in the direction of movement x is positioned adjacent to closed cylinder shell section 7, valve 1 will have a through-flow path running through the relevant passage or passages 6, with its through-flow cross-section restricted by the cross-section of the relevant passages 6 and, depending on the displacement of moving element 4 and possibly also by the closed cylinder shell section 7 which, depending on the excursion of valve 1 from its rest position, may cover part of the cross-section of at least one of the passages 6.

As shown in FIG. 1, valve 1 according to the invention has several passages 6, with different cross-sections and with their centres offset from each other in the direction of movement x. The through-flow cross-section of the through-flow path will therefore change, depending on how far valve 1 and thus moving element 4 are displaced from rest position. The through-flow cross-section of the through-flow path is thereby adjustable via the excursion of valve 1 from rest position.

Figure 1B:
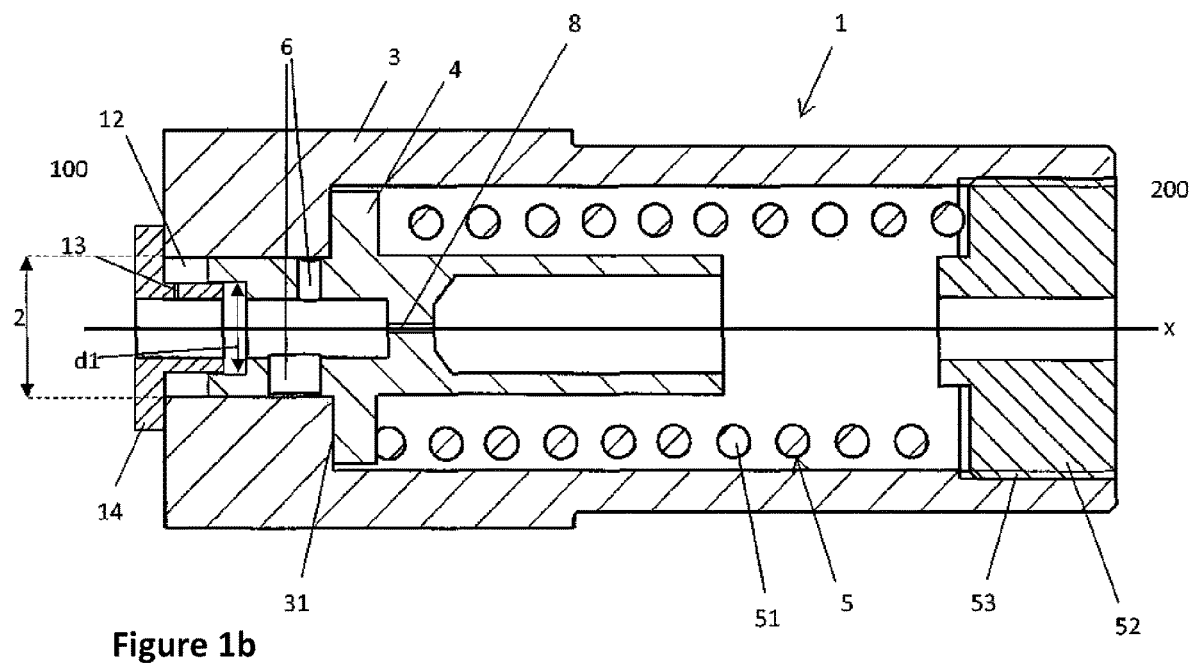
FIG. 1b is a schematic sectional view of a variation on the first embodiment.

FIG. 1*b* schematically illustrates a cross-section of an embodiment of valve 1 according to the invention, analogous to FIG. 1*a*.

The embodiment shown in FIG. 1*b* essentially corresponds to the embodiment shown in FIG. 1*a* wherein, however, the embodiment shown in FIG. 1*b* has been altered a way to include sealing element 14, a damping chamber 12 and a damping bypass 13. Furthermore, the effective area via which pressure by a fluid on the first side 100 will exert a force on the load side of moving element 4, is different from the embodiment shown in FIG. 1*a*.

The sealing element 14 is embraced by seat element 3, wherein seat element 3 and sealing element 14 constitute an inherently stable unit. Seat element 3 thereby has a stepped design that matches a correspondingly stepped form created by the stepped design of moving element 4. Damping chamber 12 is located between the steps of moving element 4 and seat element 3. Damping chamber 12 has a hydraulic connection to the first side 100 via damping bypass 13, thus permanently connecting damping chamber 12 with the first sub-chamber when valve 1 is connected to a first sub-chamber on its first side 100. When moving element 4 is displaced from its rest position shown in FIG. 1*b*, a fluid from the first side 100 will reach damping chamber 12 via damping bypass 13. A displacement of moving element 4 from its rest position is largely prevented unless fluid can reach damping chamber 12. The small damping bypass 13 connecting damping chamber 12 and first side 100 will ensure additional damping of valve 1, which may be beneficial especially when deploying valve 1 in a hydraulic damper according to the invention. It is evident from FIG. 1*b* that the volume of damping chamber 12 will depend on the position of moving element 4 along the displacement path in the direction of movement x.

FIG. 1*b* furthermore shows that diameter d2 of the cylinder section of moving element 4 containing passages 6, is significantly greater than diameter d1 which determines the effective area over which moving element 4 will be subjected on its load side to pressure by a fluid on first side 100, thereby to exert a displacement force on moving element 4. As per the embodiment shown in FIG. 1*b*, valve 1 is correspondingly designed such that the effective displacement force exerted by pressure on first side 100 on moving element 4 may be relatively small for a certain first side 100 pressure on valve 1, whilst the through-flow cross-section through arrangement of passages 6 in a cylinder section with a large diameter d2 may be correspondingly large for a relevant excursion of valve 1 from its rest position.

Figure 2:
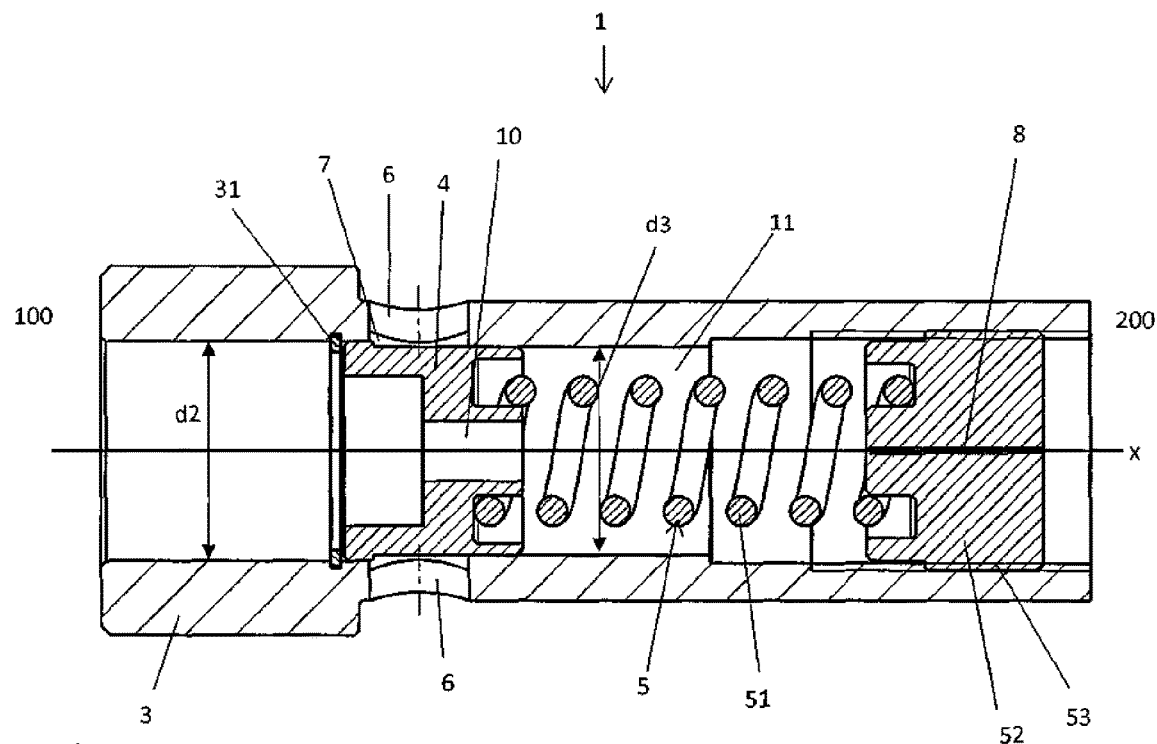
FIG. 2 is a schematic sectional view of a second embodiment of the valve according to the invention.

FIG. 2 schematically shows a further embodiment of valve 1 according to the invention. Valve 1 comprises a seat element 3 with a hollow cylindrical section that contains passages 6 in its cylinder shell. In the rest position of valve 1 shown in FIG. 2, valve 1 has no through-flow path, since it is designed to block the flow of fluid between the two sides 100, 200. In rest position, a closed cylinder shell section 7 containing moving element 4 is to this end positioned opposite passages 6. The closed cylinder shell section 7 is not, however, in close contact with the edge of passages 6 in rest position, since both seat element 3 and moving element 4 are stepped, thereby reducing the diameter along the direction of movement x of moving element 4 from diameter d2 to diameter d3 and correspondingly reducing the inside diameter of the hollow cylindrical seat element 3 from d2 to d3.

Spring system 5 is designed analogous to spring systems 5 of the embodiments shown in FIGS. 1*a* and 1*b* and correspondingly features a spring element 51, a support element 52 and an adjustment device 53. Spring system 5 will in rest position press moving element 4 against the ring-shaped end stop 31 which is embraced by seat element 3. When pressure is exerted on moving element 4 from the first side 100 in a way to exert an effective displacement force on moving element 4 that exceeds the restoring force the spring system 5 is exerting on moving element 4, valve 1 and thereby moving element 4 will be displaced from rest position, effectively displacing moving element 4 from rest position in the direction of movement x. As soon as passages 6 are positioned at least partially adjacent to closed cylinder shell section 7 of moving element 4 when moving element 4 is displaced in the direction of movement x, valve 1 will have a through-flow path with a cross-section that will increase as the excursion in the direction of movement x increases, until the closed cylinder shell section 7 fully exposes all the passages 6. In the embodiment of the invention shown in FIG. 2, support element 52 has a bypass 8 via which sides 100 and 200 of valve 1 will be permanently hydraulically connected.

Moving element 4 furthermore comprises a fluid channel 10 connecting the load side of moving element 4 to the opposite side of moving element 4. Seat element 3 comprises a back pressure chamber 11 on the opposite side of moving element 4.

When pressure is brought to bear on valve 1 from its first side 100, fluid will pass through fluid channel 10 to the back pressure chamber 11, to there exert a force against direction of movement x on moving element 4. The effective area via which a fluid on the first side 100 will thus exert pressure on moving element 4 to thereby create a displacement force on moving element 4 in the direction of movement x, may thus be calculated based on the difference of the cross-sections defined by diameters d2 and d3. The displacement force may thus be kept low in this way, even should the first side 100 exert high pressures valve 1, thus allowing the use of simple and low-cost spring systems 5 in valve 1 in the illustrated embodiment according to the invention.

Figure 3A:
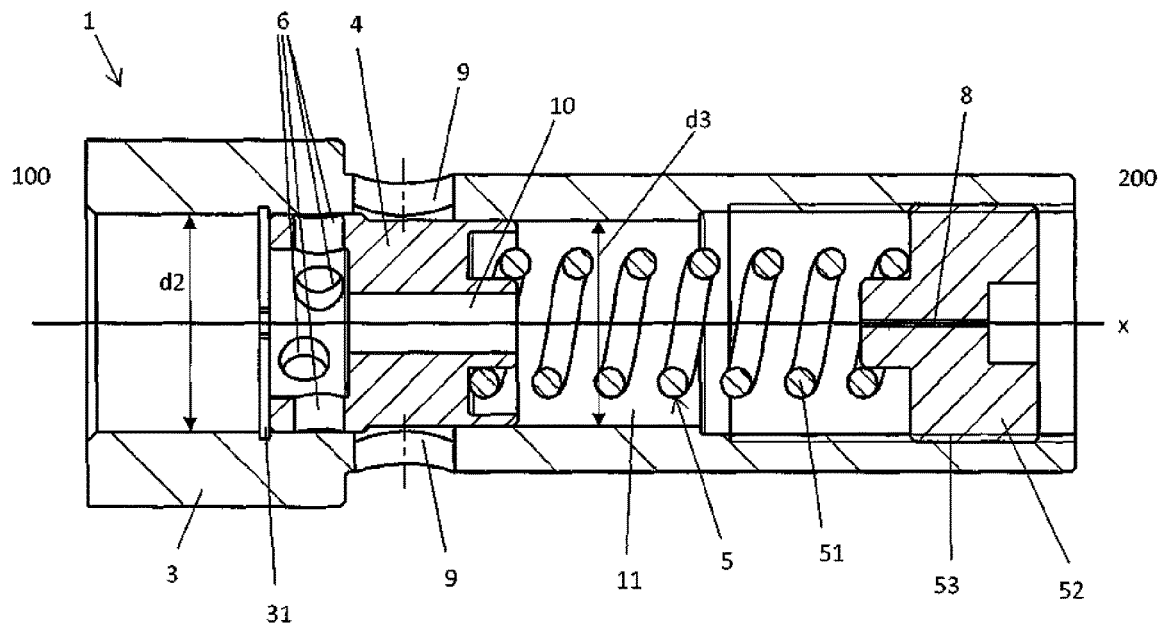
FIG. 3a is a schematic sectional view of a third embodiment of the valve according to the invention.

FIG. 3a schematically depicts a variation on the embodiment illustrated in FIG. 2. The embodiment illustrated in FIG. 3a differs from that in FIG. 2 mainly in terms of the moving element 4 exhibiting a cylinder section with passages 6, wherein seat element 3 provides passage openings 9. In the rest position shown in FIG. 3, valve 1 will block the flow of fluid between the two sides 100, 200 of valve 1. Bypass 8 will allow only a small fraction of fluid to flow between the two sides 100, 200. When valve 1 is displaced from rest position, thereby also displacing element 4 away from its rest position against stop 31, a through-flow path will open in valve 1 as soon as the cross-sectional areas of at least some of the passages 6 overlap with the cross-sectional areas of at least some of the passage openings 9. As explained already, the provision of passage openings 9 and passages 6 will allow particularly good adjustment of the passage cross-section as a function of the excursion of valve 1.

The fact that, in the example of the embodiment of the invention shown in FIG. 3a, the centres of passages 6 are offset to each other in the direction of movement x, partially at least, is another factor contributing to the good adjustability of the cross section of the through-flow path. The number of passages 6 whose cross-section may be positioned opposite the cross-section of passage openings 9, is thus variable as a function of the displacement of moving element 4. This also means that the joint cross-sectional area of passages 6 included in the through-flow path may be increased as the excursion from rest position increases.

Figure 3B:
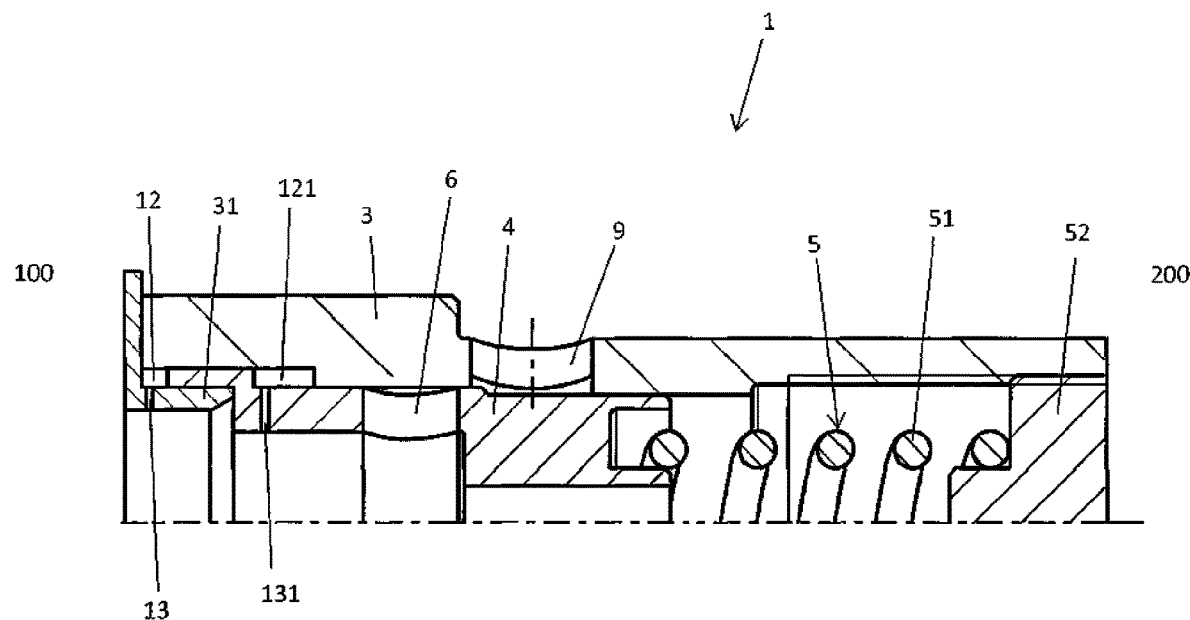
FIG. 3b is a schematic sectional view of a section of a variation on the third embodiment of the valve according to the invention.

FIG. 3b shows a section of an example of an embodiment of a valve 1 according to the invention, corresponding to a variation on valve 1 as shown in FIG. 3a. As opposed to the valve 1 shown in FIG. 3a, the valve 1 shown in FIG. 3b has a damping chamber 12 and a further damping chamber 121, each with a hydraulic connection to the first side 100 of valve 1 via a damping bypass 13, 131. Damping chambers 12, 121 are created by means of corresponding steps provided in seat element 3 and moving element 4. FIG. 3b shows that the volume of damping chambers 12, 121 will change as the moving element 4 is displaced in the direction of movement x. Starting from rest position as shown in FIG. 3b, the volume of damping chamber 12 will increase with increasing excursions, whilst the volume of damping chamber 121 will decrease with increasing excursions. Both damping chambers 12, 121 and their assigned damping bypasses 13, 131 will in any case increase the damping in valve 1 shown in FIG. 3b, since bypasses 13, 131 will limit the flow of fluid into and out of damping chambers 12, 121, thereby damping displacements of moving element 4 relative to seat element 3 and the required change in volume of damping chambers 12, 121 and the commensurate flow of fluid through damping bypasses 13, 131.

Figure 4:
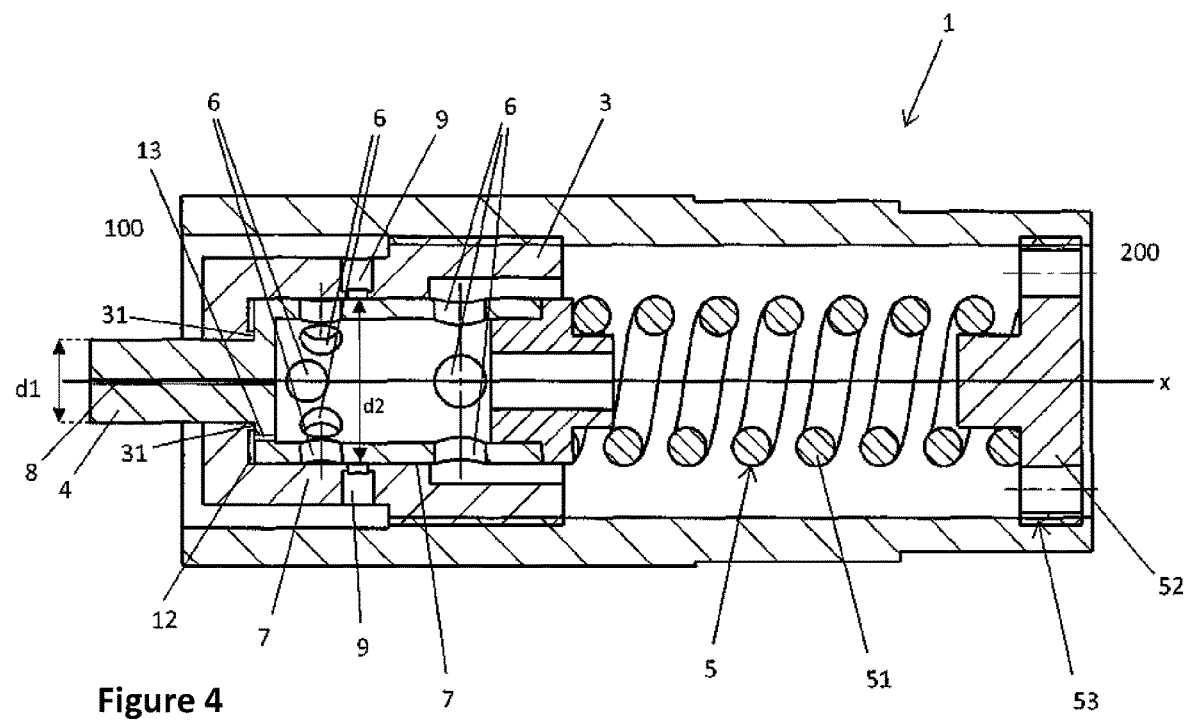
FIG. 4 is a schematic sectional view of a fourth embodiment of the valve according to the invention.

FIG. 4 shows another example of an embodiment of a valve 1 according to the invention. The example of an embodiment as shown in FIG. 4 also has a moving element 4 and a seat element 3, with also a spring system 5 comprising spring element 51, support element 52 and adjustment device 53. Seat element 4 has a bypass 8 connecting the load side with the opposite side of moving element 4, thereby allowing a small flow of fluid between sides 100, 200 of valve 1 even at very slight pressure difference between sides 100, 200. Moving element 4 has a diameter d1 at its load side, creating an effective area over which fluid at the first side 100 will exert pressure on the load side of moving element 4. Moving element 4 furthermore has a cylinder section designed as a hollow cylinder. This cylinder section also comprises passages 6 in the cylinder shell. This cylinder section has a diameter d2 which is significantly larger than diameter d1 of moving element 4 at its load side. The difference between diameters d1 and d2 of moving element 4 is realised through the stepped design of moving element 4. The stepped design thus allows the force exerted on moving element 4 to be kept relatively low due to the small effective area on the load side, even should the first side 100 exert large pressures on moving element 4, whereas a large cross-section of the through-flow path through passages 6 for a specific excursion of valve 1 may be ensured by providing passages 6 on a cylinder section with a large diameter d2.

In the rest position shown in FIG. 4, spring system 5 presses moving element 4 against end stop 31 of seat element 3. Moving element 4 will be displaced from its rest position when a displacement force acts on the load side of moving element 4 that exceeds the restoring force spring system 5 exerts on moving element 4 against direction of movement x.

As soon as moving element 4 is displaced from its rest position in direction of movement x such that the closed cylinder shell section 7 is positioned next to passages 6, with the cross-section of at least some of the passages 6 overlapping the cross-section of passage openings 9 that are arranged in a cylinder shell section of seat element 3, a through-flow path will open in valve 1, allowing fluid to pass from the first side 100 to the second side 200.

FIG. 4 furthermore shows that moving element 4 includes another cylinder section with more passages 6. Via the excursion of moving element 4 from rest position along its displacement path, the flow of fluid through the through-flow path may, with increasing excursion, be increased by moving additional passages 6 closer to the second side 200, thereby reducing the resistance in the through-flow path. This is because another closed cylinder section of seat element 3 will be positioned opposite the further passages 6, thereby shortening the path a fluid flowing along the further closed cylinder section must take from the first side 100 to reach the second side 200, as moving element 4 moves from its rest position. The further passages 6 will moreover ensure that fluid entering the hollow cylinder section of moving element 4 from the first sub-chamber 100 via passages 6, will be able to exit this section of moving element 4 to enter the second sub-chamber 200 via a large through-flow cross-section, thereby ensuring that the flow of fluid from first sub-chamber 100 to second sub-chamber 200 will be throttled exclusively through the combinations passage openings 9 and passages 6 that regulate fluid inflow from the first sub-chamber 100 to moving element 4.

The valve 1 according to the invention, shown in FIG. 4, furthermore comprises a damping chamber 12 and a damping bypass 13. Valve elements 3, 4 are each stepped, thus exhibiting a shape stepped down in the direction of movement. The space between steps creates the damping chamber 12. The volume of damping chamber 12 thus varies as the position of moving element 4 varies along the displacement path. Damping bypass 13 is constructed as a bore in moving element 4, connecting the second sub-chamber 200 with damping chamber 12. Since damping chamber 12 hydraulically communicates with its environment exclusively via damping bypass 13, a flow of fluid through damping bypass 13 will be required to vary the volume of damping chamber 12. The small cross-section of damping bypass 13 will therefore further enhance the damping performance of valve 1.

Figure 5:
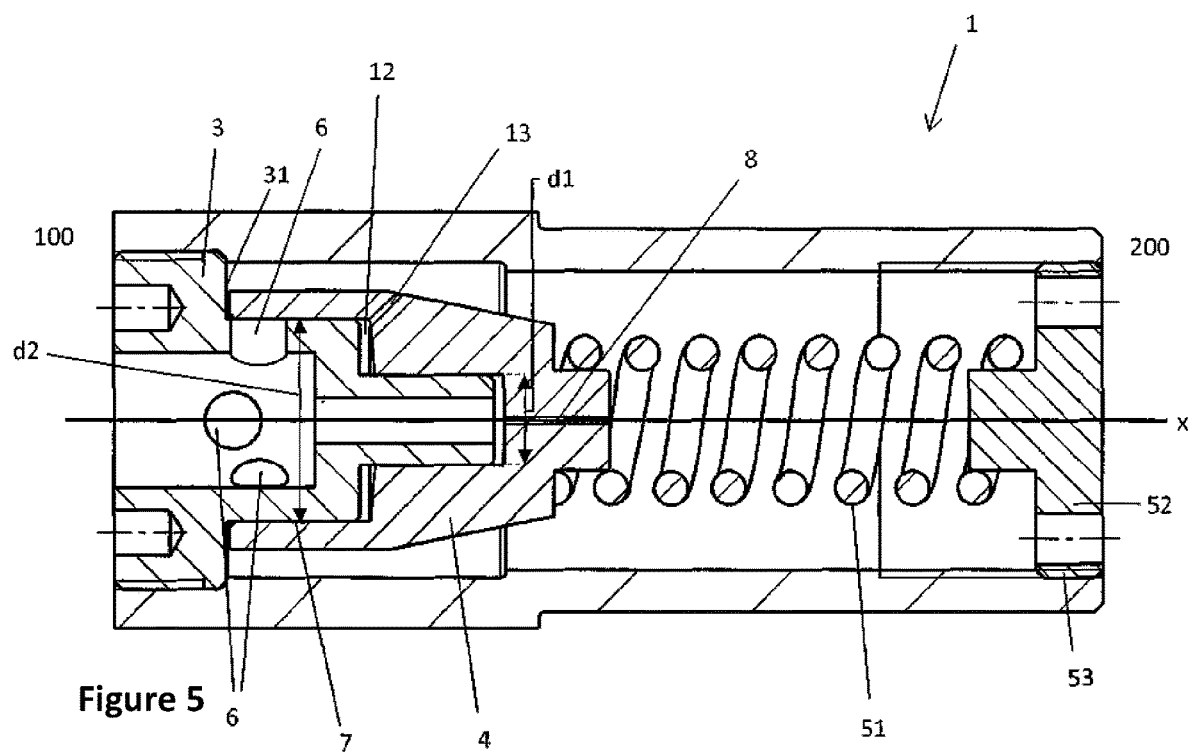
FIG. 5 is a schematic sectional view of a fifth embodiment of the valve according to the invention.

FIG. 5 schematically illustrates a further embodiment of valve 1 according to the invention. Valve 1 embraces a seat element 3 and a moving element 4, each stepped in the direction of movement x. The design stepped in the direction of movement x generally refers to one of the valve elements 3, 4 having a first cross-section at a first position, which will then change stepped in the direction of movement x for the valve element to exhibit a second cross-section at a second position. The other valve element, provided it is shaped to match the stepped shape of the first valve element, will exhibit a recess with a cross-section matching the first cross-section of the first valve element, wherein the other valve element, at a further position spaced in the direction of movement x from the first position, will exhibit a recess with a second cross-section corresponding to the second cross-section of the first valve element.

In the present case, seat element 3 comprises a first cylinder section with a cross-section defined by diameter d1 and, offset in the direction of movement x, a second cylinder section with a cross-section defined by diameter d2, wherein diameter d2 is significantly larger than diameter d1. Moving element 4 is designed as a correspondingly hollow cylinder, with a first and a second section with inside diameters essentially matching diameters d1 and d2, thus guiding moving element 4 along seat element 3.

Seat element 3 comprises passages 6 in the second cylinder section. In rest position, passages 6 will be opposite a closed cylinder shell section 7 of the second cylinder section of moving element 4. In rest position as shown in FIG. 5, spring system 5 will press moving element 4 against end stop 31 of seat element 3. With an excursion of valve 1 from its rest position, moving element 4 will be displaced from its rest position in the direction of movement x along the displacement path, allowing passages 6 to be positioned at least partially adjacent to closed cylinder shell section 7 in the direction of movement x. At a specific excursion of valve 1 from its rest position, valve 1 will correspondingly open a through-flow path including at least some of the passages 6.

The stepped designs of seat element 3 and moving element 4 furthermore ensures that passages 6 may be arranged in a cylinder shell section 7 with a large diameter, whereas the effective area over which moving element 4 may experience a first side 100 fluid pressure on its load side is simultaneously kept small, allowing the demands made on spring system 5 in respect of the required restoring force which said system must exert on moving element 4 to adequately damp valve 1 may be kept relatively modest.

The example of an embodiment of valve 1 according to the invention illustrated in FIG. 5 shows a damping chamber 12 with a permanent hydraulic connection to the second side 200 via damping channel 13. Damping chamber 12 is created by the stepped design of seat element 3 and moving element 4. The volume of damping chamber 12 will correspondingly change proportional to the excursion of valve 1 from rest position.

Figure 6:
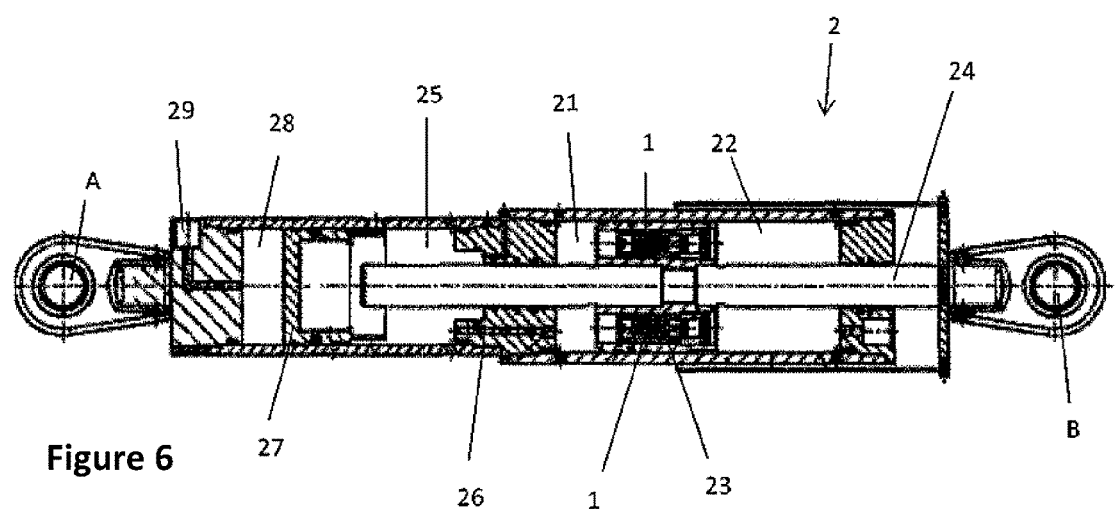
FIG. 6 is a schematic sectional view of an embodiment of the hydraulic damper according to the invention.

FIG. 6 schematically shows a cross-section of an example of an embodiment of a hydraulic damper 2 according to the invention. Hydraulic damper 2 comprises a working chamber divided by piston 23 into a first sub-chamber 21 and a second sub-chamber 22. Piston 23 is solidly attached to piston rod 24. This means that any displacement of piston rod 24 will result in a corresponding displacement of piston 23 in the working chamber.

The ratio of volumes in the two sub-chambers 21, 22 will change with every displacement of piston 23 along its path in the working chamber. The piston path is the path along which piston 23 is movable in the working chamber in the axial direction of piston rod 24. Piston 23 comprises two valves 1 that will permit a flow of fluid between the two sub-chambers 21, 22 only whilst the difference in sub-chambers 21, 22 pressures exceeds a lower limit. A first valve 1 is designed to allow fluid to flow from the first sub-chamber 21 to the second sub-chamber 22 and will block flow of fluid in the opposite direction; a second valve 1 is designed to allow fluid to flow from the second sub-chamber 22 to the first sub-chamber 21 and to block fluid flow in the opposite direction.

A first mounting device A is connected to the enclosure of the work chamber, whilst a second mounting device B is connected to the piston rod 24. To dampen movement due to forces between the two structural elements, hydraulic damper 2 may be fastened to a first structural element by first mounting device A and to a second structural element by second mounting device B. Forces exerted on the two mounting devices A, B, which compress or expand the hydraulic damper 2, will move piston 23 inside the working chamber. This will compress the fluid inside one of the two sub-chambers 21, 22, creating a difference between the pressures in said sub-chambers and opening at least one of the valves 1 to allow a flow of fluid between sub-chambers 21, 22. Piston 23 will thus effectively move in the working chamber and change the ratio of volumes in the two sub-chambers 21, 22. The movement of piston 23 in the working chamber will dampen the force transmitted to the two mounting devices A, B.

A compensation chamber 25 is located axially in line behind the working chamber. The axial direction is defined by the direction in which piston rod 24 extends. The compensation chamber 25 is connected to the working chamber via a channel 26. Channel 26 has a small cross-section to allow only a small flow of fluid to pass between compensation chamber 25 and the working chamber via this channel 26. Channel 26 connects compensation chamber 25 with the first sub-chamber 21 of the working chamber. A gas pressure chamber 28, separated from compensation chamber 25 by a separation element 27, is located axially in line behind compensation chamber 25.

The separation element 27 is designed axially displaceable, wherein displacement of the separation element 27 will change the ratio of gas pressure chamber 28 the compensation chamber 25 volumes.

In the example of an embodiment shown in FIG. 6, the piston rod 24 will extend along the piston path into compensation chamber 25 for any position of piston 23. Any displacement of piston 23 along the piston path will thus change the piston rod 24 volume in compensation chamber 25. Changing the piston rod 24 volume in compensation chamber 25 will always change the ratio of gas pressure chamber 28 volume and compensation chamber 25 volume (provided hydraulic damper 2 is a closed system without external impact, for instance on gas pressure chamber 28, as is the case here). Displacement of piston 23 in the working chamber in a way to reduce the volume of the first sub-chamber 21 and correspondingly increase the volume of the second sub-chamber 22 will, for instance, directly increase the piston rod 24 volume in compensation chamber 25, thereby moving separation element 27 to decrease the volume of gas pressure chamber 28 and increase the volume of compensation chamber 25. This will increase the pressure in gas pressure chamber 28, creating a restoring force on piston rod 24. A hydraulic damper 2 according to the invention, with its staggered arrangement of working chamber 24, compensation chamber 25 and gas pressure chamber 28, therefore has a very simple design and will at the same time allow a restoring force to be exerted on piston rod 24 and thus piston 23 when the hydraulic damper 2 is displaced from the stationary position in which it was fastened by means of its mounting devices A, B.

Hydraulic damper 2 according to the invention furthermore provides a nozzle 29 via which gas pressure chamber 28 may be filled with gas or its pressure controlled. Excessive overpressure in gas pressure chamber 28 may, for instance, also be effectively prevented in this way. In the example of an embodiment described, simple provisioning of gas pressure chamber 28 via nozzle 29 is facilitated since gas pressure chamber 28 is located axially in line behind compensation chamber 25, which in turn is arranged axially in line behind the working chamber.

The examples of embodiments of the valve according to the invention and of the hydraulic damper according to the invention conclusively demonstrate that the valve according to the invention and the hydraulic damper according to the invention have a simple design and can offer significant advantages over conventional valves or hydraulic dampers. The simple design of the valves according to the invention render these easy and cost-effective to produce, enabling the manufacture of hydraulic dampers to damp forces arising between two structural elements over a large functional range, since the valves can provide a through-flow path of varying cross-section, depending forces exerted on the hydraulic damper, wherein the cross-section of the through-flow path may, for instance, be enlarged for larger forces.

The hydraulic damper according to the invention will therefore be particularly well suited for damping of vibrations over a large functional range.

The staggered design of the hydraulic damper according to the invention will furthermore also facilitate maintenance. The hydraulic damper according to the invention furthermore ensures reliable restoring forces to reduce excursions of structural elements between which the hydraulic damper will be mounted to a minimum and to also dampen vibrations in particular.

LIST OF REFERENCE NUMBERS

1 Valve
2 Hydraulic damper
3 Seat element
4 Moving element
5 Spring system
6 Passage
7 Closed cylinder shell section
8 Bypass
9 Passage opening
10 Fluid passage
12 121 Damping chamber
131 Damping bypass
14 Sealing element
16 Back pressure chamber
21 First sub-chamber
22 Second sub-chamber
23 Piston
24 Piston rod
25 Compensation chamber
26 Channel
27 Separation element
28 Gas pressure chamber
29 Feed line
31 End stop
51 Spring element
52 Support element
53 Adjustment device
100 First side
200 Second side
A First mounting device
B Second mounting device
d1, d2, d3 Diameter
x Direction of movement

What is claimed is:

1. A valve configured to ensure equalisation of pressures between sub-chambers of a hydraulic damper, the valve comprising:
   a first side for connection to a first sub-chamber and a second side for connection to a second sub-chamber,
   wherein the valve, when in a rest position, is configured to block a flow of fluid between the first side and the second side, and, when displaced from the rest position, is configured to open a through-flow path with a through-flow cross-section to allow the flow of the fluid,
   wherein the valve comprises two mutually guided valve elements that are movable relative to each other in a direction of movement (x),
   wherein one of the two valve elements is configured as a moving element and the other valve element is configured as a seat element,
   wherein the moving element is configured to be exposed on a load side to a fluid pressure on the first side to create an effective displacement force acting on the moving element in the direction of movement (x),
   wherein the moving element is connected to a spring system to exert a restoring spring force opposing the effective displacement force on the moving element,
   wherein one of the two valve elements includes a cylinder section with a plurality of passages,
   wherein the through-flow path passes through at least some of the passages and the cross section of the through-flow path is limited by a cross-section of the passages,
   wherein the other valve element comprises at least one cylinder shell section that, at least in the rest position, rests against the first valve element to block the flow of the fluid,
   wherein the cross section of the through-flow path is adjustable via excursion of the valve as a result of displacement of the moving element relative to the seat element in the direction of movement (x), and wherein the cross section of the through-flow path is adjustable such that the cross section of the through-flow path increases as the excursion of the valve increases, wherein, when in the rest position or a position displaced from the rest position, an effective area of the moving element, via which the moving element is to be exposed to a fluid on the first side exerting pressure on the moving element to create the effective displacement force on the moving element is less than a cross-sectional area of the cylinder section containing the passages, wherein the valve has a damping system comprising at least one damping chamber, located between the seat element and the moving element and having a volume dependent on a position of the moving element along the displacement path, wherein the damping system comprises a damping chamber bypass to connect the at least one damping chamber to the first and/or second sub-chamber, wherein the at least one damping chamber communicates with the flow-through path exclusively via the damping chamber bypass, and wherein fluid can only enter and can only exit the at least one damping chamber through the damping chamber bypass.

2. The valve according to claim 1, wherein the valve comprises a bypass for continuous connection of the two sides.

3. The valve according to claim 1, wherein the cylinder section of the valve element with the passages is configured as a hollow cylinder.

4. The valve according to claim 1, wherein at least one section of the other valve element is configured as a hollow cylinder with the at least one cylinder shell section, wherein a further cylinder shell section with passage openings is arranged axially in line with the at least one cylinder shell section.

5. The valve according to claim 1, wherein the at least one cylinder shell section of the other valve element comprises two cylinder shell sections separated from each other in the direction of movement (x) by passage openings, wherein the one valve element has two zones separated from each other in the direction of movement (x), each with passages.

6. The valve according to claim 1, wherein the combined cross-sectional area of the passages through which the through-flow path passes increases with the excursion of the valve from the rest position by the displacement of the moving element along a displacement path.

7. The valve according to claim 1, wherein at least some of the passages are mutually offset with their centres in the direction of movement (x).

8. The valve according to claim 1, wherein the number of passages in the direction of movement (x) varies, wherein the number of passages increases in the direction of movement (x) such that the number of passages included in the through-flow path will increase as the excursion of the valve from the rest position and the associated displacement of the moving element along its displacement path increases.

9. The valve according to claim 7, wherein at least some of the passages mutually offset in the direction of movement (x), have differing cross-sectional areas, wherein the cross-sectional area of passages increases in the direction of movement (x) such that the cross-sectional area of passages included in the through-flow path increases with increasing excursion of the valve from the rest position.

10. The valve according to claim 1, wherein the diameter of the moving element changes at least by section, in a stepped manner and reducing towards the load side in the direction of movement (x).

11. The valve according to claim 1, wherein the moving element has a fluid channel that extends parallel to the direction of movement (x) with at least one component of direction to ensure a hydraulic connection between the load side and a side opposite to the load side of the moving element, wherein a back pressure chamber is arranged at the opposite side configured to take up and retain fluid reaching the opposite side via the hydraulic connection, to create back pressure on the opposite side of the moving element to ensure exertion of a force on the moving element to oppose the displacement force.

12. The valve according to claim 1, wherein the spring system comprises a spring element and a support element connected to the seat element, wherein a tension adjustor is provided to tension the spring element between the support element and the moving element in order to pre-set the restoring force the spring system exerts on the moving element when in rest position.

13. The valve according to claim 1, wherein the moving element and the seat element are each stepped in the direction of movement (x), wherein the damping chamber is created between the steps of the two valve elements.

* * * * *